United States Patent [19]

Murata et al.

[11] Patent Number: 4,855,374

[45] Date of Patent: Aug. 8, 1989

[54] OPTICAL RESIN FROM DIALLYL ESTERS

[75] Inventors: Yoshishige Murata; Yasumi Koinuma; Naoyuki Amaya, all of Oita; Takayuki Otsu, Nara; Masafumi Nisimura, Oita, all of Japan

[73] Assignee: Nippon Oil and Fats Co., Ltd., Tokyo, Japan

[21] Appl. No.: 211,166

[22] Filed: Jun. 22, 1988

Related U.S. Application Data

[60] Continuation of Ser. No. 30,299, Mar. 23, 1987, abandoned, which is a division of Ser. No. 806,735, Dec. 9, 1985, abandoned.

[51] Int. Cl.$^4$ .................. C08F 226/06; C08F 218/16
[52] U.S. Cl. .................. 526/261; 526/281; 526/283; 526/292.3; 526/292.4; 526/296; 526/309; 526/313; 526/314; 526/323
[58] Field of Search .................. 526/292.3, 292.4, 296, 526/309, 313, 321, 323, 261, 314, 281, 283, 308

[56] References Cited

U.S. PATENT DOCUMENTS

| | | | |
|---|---|---|---|
| 2,273,891 | 2/1942 | Pollack | 526/323 |
| 2,311,327 | 2/1943 | Bradley | 526/323 |
| 2,431,374 | 11/1947 | D'Alelio | 526/323 |
| 2,510,503 | 6/1950 | Kropa | 526/261 |
| 2,709,162 | 5/1955 | Luce | 526/321 |
| 3,096,310 | 7/1963 | Heiberger | 526/323 |

FOREIGN PATENT DOCUMENTS 529906 9/1956 Canada.

*Primary Examiner*—Christopher Henderson
*Attorney, Agent, or Firm*—Jordan and Hamburg

[57] ABSTRACT

According to the invention, there are provided an optical resin and a process for preparing such a resin. The optical resin is obtained by polymerizing a feed monomer comprising at least a diester of dicarboxylic acid represented by the general formula (1) of:

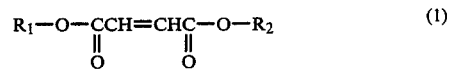

(1)

wherein $R_1$ and $R_2$ each represent the same or different groups and stand for an alkyl or alkenyl group having 1 to 12 carbon atoms, a cycloalkyl group having 3 to 12 carbon atoms or an ester residue having at least one aromatic ring.

1 Claim, No Drawings

OPTICAL RESIN FROM DIALLYL ESTERS

This application is a continuation of application Ser. No. 030,299, filed Mar. 23, 1987, now abandoned, which in turn is a divisional application of Ser. No. 806,735, filed Dec. 9, 1985, now abandoned.

BACKGROUND OF THE INVENTION

The present invention relates to an optical resin and a process for preparing the same, and more particularly to an optical resin including a polymer of a special diester of dicarboxylic acid and a process for preparing such an optical resin.

Organic polymer materials have hitherfore been used as substitutes for inorganic glasses, while taking advantage of their excellent properties such as that they are transparent and of light weight and can be handled safely and easily machined.

Representative examples of organic polymer materials which have been used as organic glasses are polymethyl methacrylate, polycyclohexyl methacrylate, polydiethyleneglycol bisallyl carbonate, polycarbonate and polystyrene.

These organic polymer materials are used for wide optical applications while taking advantage of the aforementioned merits, although they are inferior in resistance to scratching or abrasion, refractive indices and resistance to heating. However, since the refractive indices of polymethyl methacrylate, polycyclohexyl methacrylate and polydiethylene glycolbisallyl carbonate are as low as $n_D = 1.49$ to $1.51$, it is inevitable that a lens made of any of these materials becomes considerably thicker than that of a lens made of an inorganic glass. Moreover, relatively skillful technology is necessitated to produce a lens by the cast molding method, since the percent shrinkages at the step of heating to cure these materials are extremely high, ranging from 10 to 25%. Furthermore, these materials are inferior in resistance to heating and in resistance to scratching and abrasion.

Although polystyrene and polycarbonate have high refractive indices of $n_D = 1.59$, they are inferior in weather-proof property and detrimental in resistance to chemicals and heating. Another disadvantage of these materials is that they are not adapted for cast molding which is a favorite molding process for the production of articles having various shapes and dimensions. They are generally molded by means of melt molding processes, such as injection molding, by which an optically uniform article is difficult to produce to double refraction resulting from the melt molding.

SUMMARY OF THE INVENTION

A primary object of this invention is to provide an optical resin having a high refractive index and a low coefficient of shrinkage and to provide a process for preparing such an optical resin.

Another object of this invention is to provide an optical resin which is excellent in heat resistance and weather-proof properties and which is easily released from a mold and to provide a process for preparing such an optical resin.

A further object of this invention is to provide an optical resin which can be molded simply by a one-step cast molding through a radical polymerization reaction and to provide a process for preparing such an optical resin.

The above and other objects of this invention will become apparent from the following description of the invention.

According to the present invention, there is provided an optical resin obtained by polymerizing a feed monomer comprising at least a diester of dicarboxylic acid represented by the general formula (1) of:

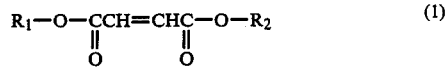

wherein $R_1$ and $R_2$ each represent the same or different groups and stand for an alkyl or alkenyl group having 1 to 12 carbon atoms, a cycloalkyl group having 3 to 12 carbon atoms or an ester residue having at least one aromatic ring.

According to the present invention, there is also provided a process for preparing an optical resin comprising the steps of:

(a) adding a polymerization initiator selected from the group consisting of organic peroxides and azo compounds, each having a decomposition temperature of not more than 120° C. at selected half-life value for 10 hours, to a feed monomer comprising at least a diester of dicarboxylic acid represented by the general formula (1) of:

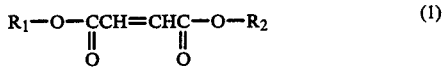

wherein $R_1$ and $R_2$ each represent the same or different groups and stand for an alkyl or alkenyl group having 1 to 12 carbon atoms, a cycloalkyl group having 3 to 12 carbon atoms or an ester residue having at least one aromatic ring, to thereby obtain a feed mixture;

(b) supplying the feed mixture into a die; and (c) curing the feed mixture by heating to obtain the optical resin.

DETAILED DESCRIPTION OF THE PREFERRED EMBODIMENT

The present invention will be described in detail.

The feed monomer used in the invention contains at least a diester of dicarboxylic acid represented by the following general formula (1) of:

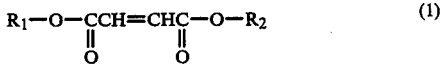

wherein $R_1$ and $R_2$ each represent the same or different groups and stand for an alkyl or alkenyl group having 1 to 12 carbon atoms, a cycloalkyl group having 3 to 12 carbon atoms or an ester residue having at least one aromatic ring.

A diester of dicarboxylic acid represented by the general formula (1) wherein the alkyl, alkenyl or cycloalkyl group has carbon atoms of not less than 13 are difficult to synthesized, and the feed monomer containing such a diester of dicarboxylic acid is lowered in polymerizability. $R_1$ and/or $R_2$ may be ester resides each having at least one aromatic group which may include an alkyl group or a halogen atom introduced by nuclear substitution.

The diesters of dicarboxylic acid represented by the general formula (1) are diesters of fumaric acid and diesters of maleic acid. Fumarates which are the trans-isomers are more preferred than maleates which are the cis-isomers. In a case where $R_1$ and $R_2$ are alkyl or cycloalkyl groups, it is preferred that at least one alkyl or cycloalkyl group constitutes a branched structure. Specific examples of the diester of dicarboxylic acid represented by the general formula (1) wherein $R_1$ and $R_2$ each represent an alkyl, alkenyl or cycloalkyl group, include fumarates such as dimethyl fumarate, diethyl fumarate, diisopropyl fumarate, di-tert-butyl fumarate, di-sec-butyl fumarate, dicyclopentyl fumarate, dicyclohexyl fumarate, dicycloheptyl fumarate, isopropylmethyl fumarate, methyl-tert-butyl fumarate, isopropylcyclohexyl fumarate, diallyl fumarate, allylisopropyl fumarate, allylcyclohexyl fumarate, methyallylisopropyl fumarate and mixtures thereof; and maleates, such as diallyl maleate, diethyl maleate, diisopropyl maleate, dicyclohexyl maleate, allylethyl maleate, allylisopropyl maleate, allylcyclohexyl maleate and mixtures thereof. Mixtures of a fumarate and a maleate may be used. Specific examples of the diester of dicarboxylic acid represented by the general formula (1) wherein at least one of $R_1$ and $R_2$ represents an ester residue having at least one aromatic ring, include diphenyl fumarate, dibenzyl fumarate, diphenethyl fumarate, di(chlorophenyl) fumarate, di(bromophenyl) fumarate, di(chlorobenzyl) fumarate, di(bromobenzyl) fumarate, isopropylphenyl fumarate, isopropylbenzyl fumarate, cyclohexylphenyl fumarate, cyclohexylbenzyl fumarate, allylphenyl fumarate, allylbenzyl fumarate, diphenyl maleate, dibenzyl maleate, allylphenyl maleate, allylbenzyl maleate, di(phenoxyethyl)fumarate, di(orthochlorophenoxyethyl) fumarate and mixtures thereof. A diester of dicarboxylic acid represented by the general formula (1) wherein $R_1$ and $R_2$ each represent an alkyl, alkenyl or cycloalkyl group may be mixed with a diester of dicarboxylic acid represented by the general formula (1) wherein at least one of $R_1$ and $R_2$ represents an ester residue having at least one aromatic ring to prepare and use as the feed monomer.

In the present invention, a diester of dicarboxylic acid represented by the general formula (1) may be used as the feed monomer without any additives. However, according to a further aspect of the invention, the diester of dicarboxylic acid represented by the general formula (1) may be added with one or more of cross-linkable monomers each having at least one allyl group to be copolymerized by radical polymerization. Examples of the cross-linkable monomers each having at least one allyl group include diallyl phthalate, diallyl isophthalate, allyl acrylate, allyl methacrylate, diethyleneglycolbisallyl carbonate, triallyl trimellitate, triallyl isocyanurate, triallyl cyanurate, diallyl hexahydrophthalate, diallyl chlorendate and diethyleneglycol diallyl ether. The amount of the cross-linkable monomer (B) having at least one allyl group added to the diester of dicarboxylic acid (A) is not critical, with the preferable mixing ratio of A/B (by weight) ranging from 99/1 to 10/90. The coefficient of shrinkage is increased as the amount of B added to the diester of dicarboxylic acid (A) is increased.

A diester of dicarboxylic acid may be mixed with one or more radical-polymerizable vinyl monomers to be copolymerized to prepare an optical resin of the invention. Examples of the radical-polymerizable vinyl monomer, which may be used in the present invention, include aromatic vinyl compounds, such as styrene, p-methylstyrene, p-chlorostyrene, o-methylstyrene, o-chlorostyrene and divinylbenzene; methacrylates, such as methyl methacrylate, butyl methacrylate, ethyleneglycol dimethacrylate and diethyleneglycol dimethacrylate; acrylates, such as methyl acrylate, ethyl acrylate, ethyleneglycol diacrylate and diethyleneglycol diacrylate; vinyl carboxylates, such as vinyl acetate, vinyl propionate and vinyl benzoate; vinyl ethers such as ethylvinyl ether and n-butylvinyl ether; acrylonitrile and methacrylonitrile. The mixing ratio A/C (by weight) of the diester of dicarboxylic acid (A) to the radical-polymerizable vinyl monomer (C) in the copolymerizable mixture ranges preferably from 95/5 to 70/30.

A further modified optical resin of the invention may be prepared by copolymerizing the aforementioned diester of dicarboxylic acid (A) with the cross-linkable monomer having at least one allyl group (B) and the radical-polymerizable vinyl monomer (C). A preferred feed monomer mixture for the preparation of such a modified optical resin contains 95 to 10 wt % of the component (A), 90 to 5 wt % of the component (B) and 30 to 5 wt % of the component (C).

The polymer of copolymer of the invention may be prepared by polymerizing the feed monomer or monomer mixture in the presence of one or more polymerization initiators selected from organic peroxides and azo compounds each having a decomposition temperature of not more than 120° C. at selected half-life value for 10 hours. Examples of the polymerization initiators include benzoyl peroxide, diisopropyl peroxydicarbonate, tert-butyl peroxypivalate, tert-butyl peroxyneodecanoate, tert-butyl peroxydiisobutylate, azobisisobutylonitrile, lauroyl peroxide, tert-butyl peroxy-2-ethylhexanoate, 1,1-bis(tert-butylperoxy)-3,3,5-trimethylcyclohexane, tert-butylperoxy-3,5,5-trimethylhexanoate and 3,3',4,4'-tetra(tert-butylperoxycarbonyl)benzophenone.

It is preferred that not more than 10 parts by weight, more preferably not more than 5 parts by weight, of polymerization initiator be added to 100 parts by weight of the feed monomer or monomer mixture. The optical resin of the invention may preferably be prepared by casting a feed monomer or monomer mixture in a mold having desired shape and dimensions, followed by curing at an elevated temperature by polymerization or copolymerization. The optical resin of the invention may not be adapted for melt molding after it is cured by polymerization or copolymerization. It is desirous that the polymerizable feed monomer or copolymerizable feed monomer mixture be filled up in a closed chamber or put in a closed chamber which is evacuated or filled with an inert gas, such as nitrogen, carbon dioxide or helium at the polymerization step. The feed monomer or monomer mixture added with a polymerization initiator may be partially polymerized or copolymerized at a temperature of from 10° C. to 120° C., and then the partially polymerized mass may be cast in a mold having desired shape and dimensions, followed by heating to complete polymerization.

The heating temperature for curing the feed monomer or monomer mixture varies depending on the used polymerization initiator, and the feed monomer or monomer mixture is polymerized preferably at a temperature of from 30° C. to 120° C., more preferably at a temperature at which the half of the used polymerization initiator decomposes for 10 hours. The curing temperature may be raised to shorten the time required for curing or to remove unreacted monomers and polymerization initiator. The time required for complete curing ranges generally from 10 to 72 hours.

The optical resin, according to the present invention, has excellent heat resistance and weather-proof properties, and has a higher refractive index and a lower coefficient of shrinkage, as compared with the conventional optical resins. The optical resin of the invention can be easily removed from the mold to be ready for use as a lens, prism or optical fiber.

EXAMPLES OF THE INVENTION

The present invention will now be described more specifically with reference to examples thereof. It is noted here that the following examples are given by way of example only and the invention is not limited thereby in any sense.

EXAMPLE 1

100 parts by weight of dicyclohexyl fumarate was maintained at 40° C. and added with 2.5 parts by weight of diisopropyl peroxydicarbonate and 2.5 parts by weight of benzoyl peroxide, the latter two acting as polymerization initiators. The mixture was cast in a mold composed of two 20 cm × 20 cm hard glass plates and a silicone rubber packing, and the mold containing the cast mixture was placed in an oven charged with nitrogen and maintained at 40° C. for 24 hours. The cast mixture was then heated at 80° C. for an additional 4 hours and then heated at 120° C. for an additional 2 hours to complete curing. The properties of the cured resin are shown in Table 1.

The linear shrinkage of the cured resin was measured by means of the scale calibrated on the surface of one plate, and the percent shrinkage was calculated from the following equation:

$$\% \text{ Shrinkage} = \frac{(\text{Length before Curing}) - (\text{Length after Curing})}{(\text{Length before Curing})} \times 100$$

The refractive index was measured using an Abbe refractometer. The heat resistance was indicated by the glass transition temperature determined by dynamic viscoelasticity measurement. The cured resin was subjected to an accelerated weathering test for 400 hours in the Sun Shine Weather-O-Meter (Trade Name, available from Atlas Co.). The test specimens which had not become yellowish, opaque and cracked were appraised as having an acceptable weather-proof properties. The cured polymers which were readily removed or discharged from the molds were judged as having acceptable mold releasing properties.

EXAMPLE 2

Generally following procedures similar to Example 1, 80 parts by weight of dicyclopentyl fumarate and 20 parts by weight of diallyl fumarate were copolymerized at 50° C. for 24 hours, using 3 parts by weight of tert-butylperoxypivalate as a polymerization initiator. The results are shown in Table 1.

EXAMPLE 3

Generally following procedures similar to Example 1, 70 parts by weight of dicyclohexyl fumarate and 30 parts by weight of diethyleneglycolbisallyl carbonate were copolymerized using 3 parts by weight of diisopropyl peroxydicarbonate as a polymerization initiator. The results are shown in Table 1.

EXAMPLE 4

Generally following procedures similar to Example 1, 80 parts by weight of ixopropylcyclohexyl fumarate and 20 parts by weight of styrene were copolymerized using 3 parts by weight of diisopropyl peroxydicarbonate as a polymerization initiator. The results are shown in Table 1.

EXAMPLE 5

Generally following procedures similar to Example 1, 60 parts by weight of dicyclohexyl fumarate, 30 parts by weight of diethyleneglycolbisallyl carbonate and 10 parts by weight of methylmethacrylate were copolymerized at 45° C. for 24 hours, while using 3 parts by weight of tert-butyl peroxyneodecanoate as a polymerization initiator. The results are shown in Table 1.

EXAMPLE 6

Similar procedures as in Example 1 were repeated except that 50 parts by weight of diisopropyl fumarate and 50 parts by weight of diallyl isophthalate were used. The results are shown in Table 1.

EXAMPLE 7

Similar procedures as in Example 1 were repeated except that 100 parts by weight of allylisopropyl maleate were used. The results are shown in Table 1.

EXAMPLE 8

Similar procedures as in Example 1 were repeated except that 100 parts by weight of allylcyclohexyl maleate were used. The results are shown in Table 1.

COMPARATIVE EXAMPLES 1 to 3

100 parts, for each, of styrene, methylmethacrylate and diethyleneglycolbisallyl carbonate were respectively polymerized using 3 parts by weight of diisopropyl peroxydicarbonate as a polymerization initiator. The results are shown in Table 1.

TABLE 1

|  | Color | Percent Shrinkage (%) | Glass Transition Temperature (°C.) | Refractive Index ($n_D$) | Weather-proof Property *1 | Mold Releasing Property *1 |
|---|---|---|---|---|---|---|
| Example 1 | colorless | 0.6 | 158 | 1.519 | O | O |
| Example 2 | colorless | 3.5 | 163 | 1.522 | O | O |
| Example 3 | colorless | 1.3 | 134 | 1.513 | O | O |
| Example 4 | colorless | 2.6 | 136 | 1.530 | O | O |
| Example 5 | colorless | 2.8 | 141 | 1.511 | O | O |
| Example 6 | colorless | 2.0 | 175 | 1.525 | O | O |
| Example 7 | colorless | 1.5 | 123 | 1.512 | O | O |
| Example 8 | colorless | 0.8 | 145 | 1.523 | O | O |
| Comp. Ex.1* | colorless | 12.3 | 115 | 1.590 | X | O |

TABLE 1-continued

|  | Color | Percent Shrinkage (%) | Glass Transition Temperature (°C.) | Refractive Index ($n_D$) | Weather-proof Property *1 | Mold Releasing Property *1 |
| --- | --- | --- | --- | --- | --- | --- |
| Comp. Ex.2** | colorless | 15.6 | 125 | 1.491 | O | X |
| Comp. Ex.3*** | colorless | 3.7 | 87 | 1.498 | O | X |

Note:
*1 O: Acceptable
X: Not Acceptable
* Polystyrene;  Polymethyl Methacrylate; * Polydiethyleneglycolallyl Carbonate

EXAMPLE 9

100 parts by weight of allylbenzyl fumarate was maintained at 40° C. and added with 3 parts by weight of diisopropyl peroxydicarbonate as a polymerization initiator, and the mixture was cast in a mold composed of two 20 cm×20 cm hard glass plates and a silicone rubber packing. The mold containing the cast mixtures was placed in an oven charged with nitrogen and maintained at 40° C. for 24 hours. The cast mixture was then heated at 100° C. for an additional 24 hours to complete curing. The properties of the cured resin are shown in Table 2. The cured resin was subjected to tests similar to those described in Example 1. In addition, hot air of 150° C. was blown onto the cured resin, and the test specimen which had not been deformed was appraised as acceptable.

EXAMPLE 10

50 parts by weight of diphenyl fumarate and 50 parts by weight of diallyl isophthalate were maintained at 70° C., and added with 3 parts by weight of benzoyl peroxide as a polymerization initiator to copolymerize at 80° C. for 24 hours. The following procedures were the same as in Example 9. The results are shown in Table 2.

EXAMPLE 11

Generally following procedures similar to Example 10, 80 parts by weight of dibenzyl fumarate and 20 parts by weight of diallyl isophthalate were maintained at 70° C. and added with 3 parts by weight of benzoyl peroxide as a polymerization initiator to copolymerize to obtain a cured resin. The results are shown in Table 2.

EXAMPLE 12

Generally following procedures similar to Example 9, 50 parts by weight of allylbenzyl fumarate, 40 parts by weight of o-chlorostyrene and 10 parts by weight of methyl methacrylate were maintained at 40° C. and added with 3 parts by weight of diisopropyl peroxydicarbonate as a polymerization initiator to copolymerize to obtain a cured resin. The results are shown in Table 2.

EXAMPLE 13

70 parts by weight of di(o-chlorobenzyl) fumarate and 30 parts by weight of triallyl trimellitate were maintained at 80° C. and added with 3 parts by weight of 1,1-bis(tert-butylperoxy)-3,3,5-trimethylcyclohexane. The mixture was then heated at 90° C. for 24 hours to prepare a cured resin which was subjected to tests. The results are shown in Table 2.

EXAMPLE 14

Generally in accordance with the procedures as in Example 13, 70 parts by weight of di(o-bromobenzyl) fumarate and 30 parts by weight of triallyl trimellitate were polymerized. The results are shown in Table 2.

COMPARATIVE EXAMPLE 4

Each of the polystyrene, polymethyl methacrylate and polydiethyleneglycolbisallyl carbonate was subjected to test to learn the heat resistance thereof similarly as in Example 9. The results were that all of the cured resins of Comparative Examples were deformed by hot air.

TABLE 2

|  | Refractive Index ($n_D$) | Percent Shrinkage (%) | Heat Resistance (Note 1) | Mold Releasing Property (Note 1) |
| --- | --- | --- | --- | --- |
| Example 9 | 1.553 | 2.3 | O | O |
| Example 10 | 1.602 | 0.7 | O | O |
| Example 11 | 1.581 | 1.2 | O | O |
| Example 12 | 1.596 | 3.3 | O | O |
| Example 13 | 1.612 | 3.1 | O | O |
| Example 14 | 1.623 | 2.5 | O | O |

Note 1:
O: Acceptable;
X: Not Acceptable

As will be seen from Tables 1 and 2, the cured resins of the embodiments of the invention (Examples 1 to 14) have high refractive indices and low coefficients of shrinkage, and are excellent in weather-proof property, heat-resistance and mold releasing property. It should be thus appreciated that the resins of the invention are superior over those of the Comparative Examples when used for optical uses.

Although the present invention has been described with reference to the specific examples, it should be understood that various modifications and variations can be easily made by those skilled in the art without departing from the spirit of the invention. Accordingly, the foregoing disclosure should be interpreted as illustrative only and not to be interpreted in a limiting sense.

What is claimed is:

1. A transparent optical article constituted of an optical resin obtained by radical polymerization of a diester of dicarboxylic acid and a cross-linkable monomer having at least one allyl group, said diester of dicarboxylic acid being selected from the group consisting of dimethyl fumarate, diethyl fumarate diisopropyl fumarate, di-tert-butyl fumarate, di-sec-butyl fumarate, dicyclopentyl fumarate, dicyclohexyl fumarate, dicycloheptyl fumarate, isopropylmethyl fumarate, methyl-tert-butyl fumarate, isopropylcyclohexyl fumarate, diallyl fumarate, allylisopropyl fumarate, allylcyclohexyl fumarate, methallylisopropyl fumarate, diallyl maleate, diethyl maleate, diisopropyl maleate, dicyclohexyl maleate, allylethyl maleate, allylisopropyl maleate, allylcyclohexyl maleate, diphenyl fumarate, dibenzyl fumarate, diphenethyl fumarate, di(chlorophenyl) fumarate, di(bromophenyl) fumarate, di(chlorobenzyl) fumarate, di(bromobenzyl) fumarate, isopropylphenyl fumarate, isopropylbenzyl fumarate, cyclohexylphenyl fumarate, cyclohexylbenzyl fumarate, allylphenyl fumarate, allylbenzyl fumarate, diphenyl maleate, dibenzyl maleate, allylphenyl maleate, allylbenzyl maleate, di(phenoxyethyl) fumarate, di(orthochlorophenoxyethyl) fumarate and mixtures thereof, said cross-linkable monomer being selected from the group consisting of diallyl phthalate, diallyl isophthalate, allyl acrylate, allyl methacrylate, diethyleneglycolbisallyl carbonate, triallyl trimellitate, triallyl isocyanurate, triallyl cyanurate, diallyl hexahydrophthalate, diallyl chlorendate, diethyleneglycol diallyl ether and mixtures thereof, said cross-linkable monomer being mixed in a mixing ratio by weight of diester of dicarboxylic acid to cross-linkable monomer of from 99/1 to 10/90.

* * * * *